(12) United States Patent
Wells et al.

(10) Patent No.: US 6,488,585 B1
(45) Date of Patent: Dec. 3, 2002

(54) GAMING DEVICE IDENTIFICATION METHOD AND APPARATUS

(75) Inventors: Bill Wells, Reno, NV (US); James T. McGlone, Reno, NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/172,787

(22) Filed: Oct. 14, 1998

(51) Int. Cl.$^7$ .................................................. A63F 9/24
(52) U.S. Cl. ............................................ 463/43; 463/42
(58) Field of Search ............................... 463/13, 17, 18, 463/19, 20, 30, 40, 41, 42, 43, 44

(56) References Cited

U.S. PATENT DOCUMENTS

| | | | | |
|---|---|---|---|---|
| 5,086,410 A | * | 2/1992 | Bergemont | 365/53 |
| 5,644,704 A | * | 7/1997 | Pease et al. | 395/183.18 |
| 5,951,639 A | * | 9/1999 | MacInnis | 709/217 |
| 6,044,471 A | * | 3/2000 | Colvin | 713/202 |
| 6,135,887 A | * | 10/2000 | Pease et al. | 463/42 |

* cited by examiner

*Primary Examiner*—Joe H. Cheng
*Assistant Examiner*—K. Nguyen
(74) *Attorney, Agent, or Firm*—George H. Gerstman; Seyfarth Shaw

(57) ABSTRACT

An electronic memory which cannot be modified or erased, such as one-time programmable or add-only (OTP/AO) memory is used for storing direct or indirect indications of characteristics of a gaming terminal or its components. Preferably, a plurality of gaming terminal boards includes memory that has one or more rows of OTP/AO memory for storing information such as memory or board serial numbers, manufacture date, processor speed or type, software or hardware version numbers, and the like. Such information is preferably used in connection with assuring the appropriateness of modifications or configurations of the gaming terminal, such as downloading software or other software modification and/or changes to hardware configuration. OTP/AO information can be used in connection with verifying identity or characteristics of software or hardware, e.g. for warranty purposes. The non-erasable and non-modifiable nature of the information provides assurance that software downloads or other modifications will not be inappropriate because of inadvertent or intentional misidentification of a component.

21 Claims, 2 Drawing Sheets

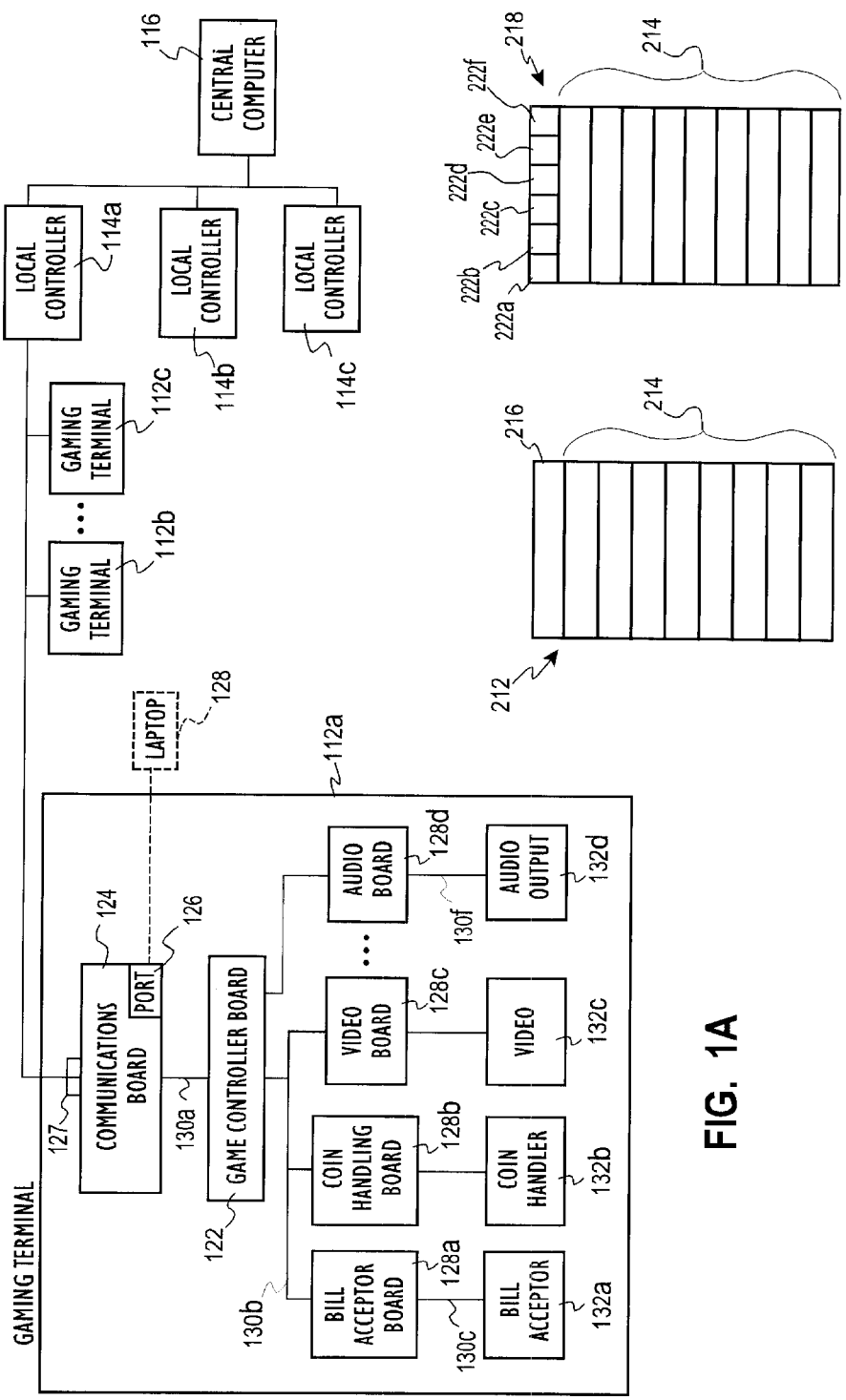

GAMING DEVICE IDENTIFICATION METHOD AND APPARATUS

FIELD OF THE INVENTION

The present invention relates an identification method and apparatus for use in identifying components of a gaming device such as a slot machine, card game machine, keno machine and the like, and, in particular, identification for machine components using a non-erasable electronic memory or memory portion such as a memory with write-once or add-only characteristics.

BACKGROUND INFORMATION

Many current gaming machines are configured with electronic components, commonly mounted on one or more printed circuit boards (PCBs). Many such electronic components use programming or other information stored in memories. In at least one typical configuration, a gaming terminal or gaming machine will include a controller board, a communications board or module, and one or more so-called peripheral boards such as a display controller board, a currency acceptor board, a coin handler board, and the like. Typically one or more of the boards, such as, e.g., the game controller board, a processor (microprocessor) or other computer unit which often operates based on programming or other information (software or firmware) stored in a memory such as one or more electronically erasable programmable read-only memories (EEPROMS). Such software or firmware may be programmed or stored in the memory locations during the manufacturing or assembly of the gaming device. Additionally, software or firmware may be provided to replace or supplement the software or firmware in a gaming device which is in operation (in the field), e.g. to update the machine configuration (such as adding new features, new games and the like, and/or to correct programming errors). In either case, the new firmware or software is transferred or "downloaded" from a source (which may be, e.g., a computer such as a workstation, personal computer, laptop computer, and the like) to the "target" memory in a particular gaming terminal or machine.

Although downloading from one computer to another is, in general, a process that is currently known, downloading software or firmware to components of gaming devices presents particular problems not readily addressed by conventional downloading techniques and apparatus.

One feature applicable to gaming device downloading is the stringent regulatory oversight and control exercised by gaming regulatory authorities in many jurisdictions. In many, and perhaps all, regulated gaming jurisdictions, downloading of software or firmware to a gaming terminal will not be permitted without some assurance that the new software or firmware will comply with local regulations. For example, a gaming regulatory authority in one jurisdiction may require assurance that downloading to, e.g., update bill acceptor software will result in a machine having bill acceptor software appropriate (and approved) for that jurisdiction (and will not, e.g., run the risk of inadvertently and/or intentionally downloading bill acceptor software that was approved in a different jurisdiction, or not at all).

It is also commonly found that gaming devices occur in a wide variety of configurations, such as employing numerous different types of processors, memories, game configurations, versions and types, peripheral hardware and software and the like. Additionally, owing to differences in manufacturing dates, maintenance history and the like, gaming devices are often encountered with a wide variety of different hardware and software components which may not be apparent (or may be discernable only with difficulty) from a visual inspection of the gaming device, its components or operation. For this reason, when it is desired to download software to a particular gaming terminal, it is typically necessary to select a particular software version for downloading, bearing in mind the types of software and hardware found on the particular gaming terminal, lest the newly-downloaded software is incompatible with the gaming terminal or results in operation which is not approved by a particular jurisdiction. Additionally, it is possible that the software or firmware which is to be downloaded is, in fact, already present on a particular gaming terminal so that the download process represents a waste of time and effort.

In typical previous situations, in order to download software or firmware to a gaming terminal, characteristics of the gaming terminal and/or its components were determined manually, such as by visually inspecting the components and/or running tests of diagnostics on a component in an attempt to determine characteristics such as the version or type of a particular board, the processor speed associated with a particular board, the version of software or hardware components, and the like. Such manual determination of characteristics has, in the past, typically required a significant investment of time, especially when a relatively large number of gaming terminals are being programmed or re-programmed, and, to make matters worse, the time investment is typically made by relatively highly-trained personnel who have the background and experience required to analyze the hardware/software components that are present. Such investment of time by relatively highly-trained personnel represents a significant expense involved in downloading information which, owing at least partly to the regulatory environment found for gaming devices, was previously believed to be largely unavoidable. Furthermore, it has been found that even relatively highly-trained personnel have a undesirably high error rate when attempting to determine characteristics needed for a download, which may lead to inoperability or improper operation of a gaming device, violation of gaming jurisdiction laws or rules and may require an additional investment of time to detect and/or correct such errors.

In addition to a downloading context, identification of gaming device components or component characteristics may be useful in the context of gaming device maintenance, service or warranty fulfillment. For example, when determining whether a repair of a gaming terminal is covered by a warranty, it may be necessary to determine when the gaming terminal was manufactured or when one of the components was manufactured or last repaired or revised.

Another feature of many gaming devices which affects the manner in which revisions of software or firmware (or hardware) can or should be performed is the fact that gaming devices are often configured to dispense money so that there is a potential for modifications or downloads to be intentionally performed in an unauthorized fashion in such a manner as to create unauthorized or improper payouts. This is a potential which is typically not present in many other types of downloads from one computer to another. Accordingly, it is important, not only to gaming regulatory authorities but also casinos or other game operators, to achieve a level of confidence that, not only will inadvertent (e.g. cross-jurisdictional) downloads be avoided, but there are procedures in place to avoid or prevent intentional or unauthorized downloads.

Accordingly, it would be advantageous to provide a method and apparatus for downloading by which the characteristics of a gaming terminal needed to avoid inadvertent or intentional improper downloads can be determined substantially automatically, i.e. while reducing, or, preferably, eliminating the need for manual characteristic determination, visual inspection of machines, their components or operation and the like. It would be particularly advantageous to provide a download process which can obtain such gaming terminal or gaming terminal component characteristics entirely automatically, i.e. using only computers or other machines and without the need for any human input or effort to accomplish such determination of characteristics. It would further be advantageous to provide such a system and method which would reduce or eliminate the potential for errors in, or unauthorized tampering with, the identification system.

SUMMARY OF THE INVENTION

The present invention includes providing gaming terminal or gaming terminal components with information usable for characterizing gaming terminal components, which is electronically stored in a memory or portion of memory which is add-only memory (AO) or one-time programmable (OTP) memory. By storing, in such memory, information which either uniquely identifies a component or identifies characteristics of a component, it is possible to configure a download system which can automatically obtain the information needed to perform a download while achieving a level of security required to make such automatic download feasible in view of the requirements of gaming regulators and/or game operators. In one embodiment, a game controller card and a plurality of peripheral cards are each provided with certain memory locations which contain information in a fashion that such information, as a practical matter, cannot be erased or changed. Such memory locations can be used to store, e.g., a unique serial number or other unique identifier, hardware characteristic information such as processor type or speed, vendor identification, date of manufacture, and the like. In this way, before downloading information to a gaming terminal, it is possible to automatically (substantially without human intervention or effort) verify that the download will be proper, such as to verify that the jurisdiction for which the gaming terminal is configured (or where the casino or other purchaser is located) is the same as the jurisdiction for which the new software has been approved, to verify that the clock speed and/or data transfer speed for which the new software is designed (or at which the download is to take place) is compatible with the clock speed of the gaming terminal or its component, that the software to be downloaded is known to be compatible with other software and/or hardware on the gaming terminal that will remain in place, and the like.

BRIEF DESCRIPTION OF THE DRAWINGS

FIGS. 2A and B are block diagrams illustrating examples of memories which may be used in connection with an embodiment of the present invention.

DETAILED DESCRIPTION OF THE PREFERRED EMBODIMENT

Figure 1B:
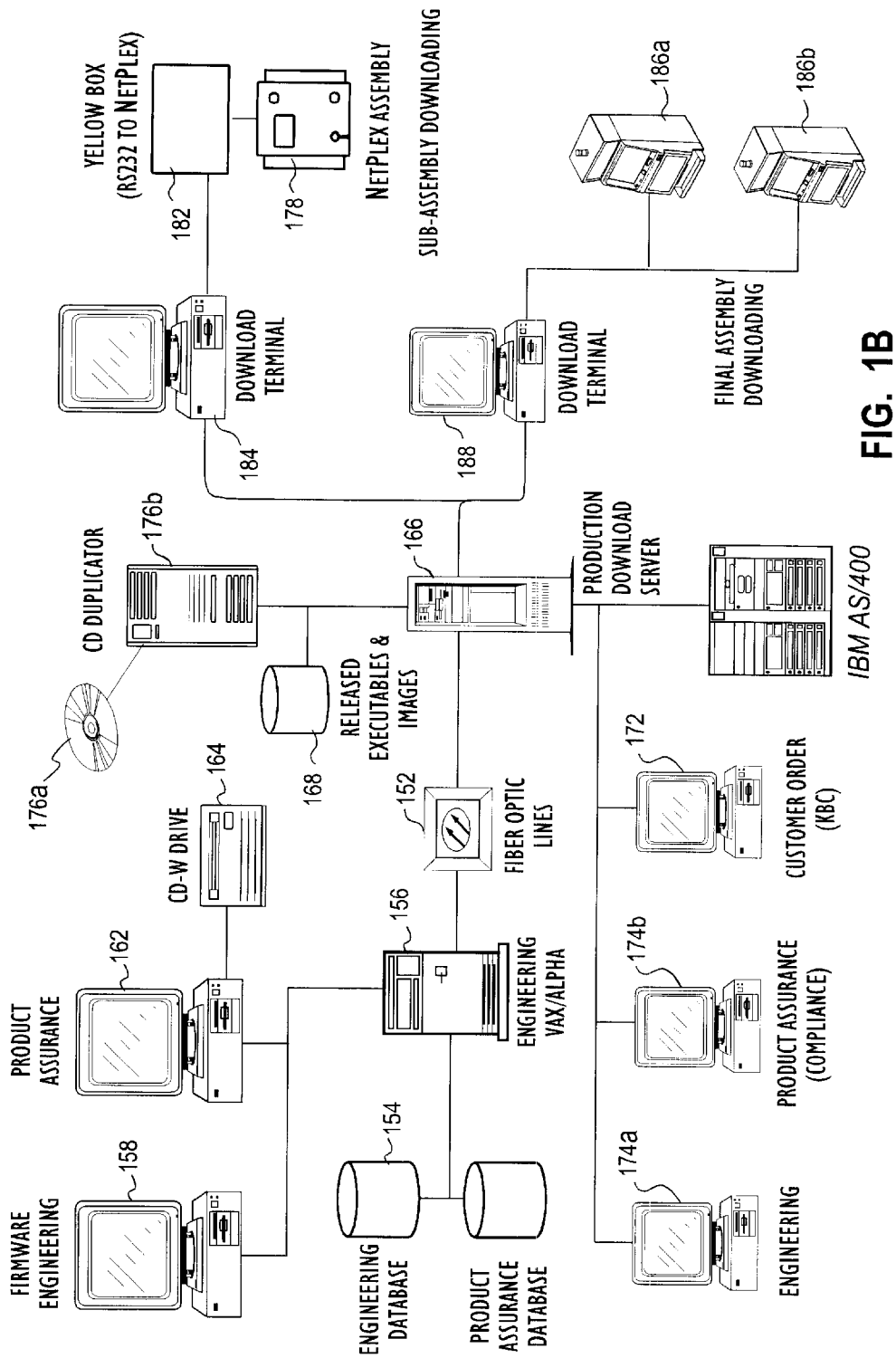
FIGS. 1A and B are block diagrams depicting components of multi-terminal gaming or production systems, including components of a gaming terminal of a type which may be used in connection with the present invention.

Although the present invention can be used in connection with many types of gaming terminals, either as stand-alone devices or coupled in any of a number of different multi-terminal configurations, FIG. 1A depicts one example of a gaming terminal 112a coupled, along with other gaming terminals 112, via one or more local controllers 114a,b,c to a central computer 116. In the embodiment of FIG. 1A, gaming terminal 112a (and, typically, all gaming terminals in the group) includes a game controller board 122 which will typically include, among other items, a microprocessor and a memory such as an EEPROM storing programming and/or other information for controlling operation of the controller board 122. Typically the hardware and software of the game controller board 122 will contain information or programming defining the type of game and making determinations of local win/loss outcome (as opposed to, e.g., non-local, progressive win/loss outcomes) for the gaming terminal 112a. Because of the central role of the game controller board 122 in determining game win/loss and, thus, in determining any monetary payout, it is particularly important to assure the presence of the correct software for the game controller board e.g. to avoid improper or incorrect payouts and to assure compliance with local regulatory authorities.

Although it is possible to combine numerous functions onto a given board, typically numerous boards will be provided in a gaming terminal for forming a plurality of functions. In the depicted embodiment, the game controller board communicates with a communications board 124 which provides information to and, receives information from a local controller 114a and/or central computer 116, for purposes such as monitoring use and performance, assuring compliance, performing accounting and similar functions, and facilitating implementation of progressive or other multi-terminal based games or prizes. In one embodiment, the communications board 124 includes one or more ports by which a laptop 128 or other computer may be coupled to the gaming terminal 112a for, among other purposes, downloading as described more fully below.

In the embodiment of FIG. 1A, a plurality of peripheral boards 128a–d communicate with the game controller board 122 and control various peripheral devices for performing various functions such as bill acceptor functions 132a, coin handling functions 134a, 132b, video functions 132c and audio output functions 132d. In many configurations, some or all of the peripheral and other boards 128a–d, 124 will contain memories, such as flash memory, EEPROMs or other devices for storing software or firmware controlling their functions (such as by containing software or firmware for running on microprocessors or other computing devices on such boards). In the strict regulatory environment for many gaming devices, it is typically necessary to provide assurance that only approved and proper software is used in the peripheral and other boards, (in addition to that provided on the game controller board).

In typical previous devices, the boards provided in a gaming terminal are secured from casual or unauthorized inspection or access such as by being housed in a normally-locked cabinet portion of the gaming terminal. Thus, in previous systems when it was desired (as described above) to (manually) verify the type or characteristics of boards on a gaming terminal (e.g. prior to a download or other updating purpose or for warranty or service purposes) it was typically necessary for a relatively highly trained worker to inactivate a gaming terminal, unlock the cabinet portion, and physically inspect (often involving removal of) one or more of the boards 122–128 of a gaming terminal 112a. Depending on the nature of the work to be performed, the skilled personnel may need to rely on experience and knowledge to recognize and distinguish different boards based on their appearance and/or notations, markings or indicia provided on boards and/or perform tests or diagnostics on the board to obtain the necessary information regarding characteristics of the board and/or its identity or history.

FIG. 1B depicts a system usable in subassembly or final assembly downloading, e.g., in a gaming terminal manufacturing environment. FIG. 1B includes a plurality of computers such as workstation computers, network server computers, and/or PC-type computers coupled by network lines such as fiber optic lines 152 in a manner well-known to those of skill in computer network technologies.

At various stages in employing the system of FIG. 1B, programming data or other information is stored in a number of different storage systems such as data bases (typically providing storage on hard drives or other well-known storage media). In the depicted embodiment, information, during program design process, is held in an engineering database 154. And software and firmware engineers use and modify such information via computers 156, 158 having at least indirect access to engineering database 154. Preferably, programs or other data which are still in the development phase are restricted to the engineering database 154 and are not stored in other databases. At some point, engineering will release the program or other information to product assurance 162 which, after review, will submit the programming or data (e.g. via writing on a CD 164 to a gaming jurisdiction for approval. After the program or data is approved by the gaming jurisdiction, the program is copied to a production download server 166 and, preferably, stored in a released database 168. Information about the approved program is provided to a customer order system 172 and other systems such as engineering 174a and product assurance 174b. Although released programs may be provided in various forms such as on CD ROM 176 via a CD duplicator 176b, FIG. 1B also illustrates a system for downloading programming data or other information as part of a gaming terminal assembly or fabrication system. The programming or data may be loaded onto boards or other subassemblies 178, e.g. via a translator/power assembly 182 and download terminal 184 or may be loaded into one or to more gaming terminals 186a,b, e.g. via connection to a communication board for downloading, in turn, to target peripheral devices or other subassemblies within the gaming terminals 186a, 186b, e.g. via a download terminal 188.

As with downloading in the field, as depicted in FIG. 1A, downloading on the fabrication or assembly line, as depicted in FIG. 1B in the strict regulatory environment for many gaming devices, it is typically necessary to provide assurance that only approved and proper software and data is used in the gaming terminals, including peripheral and other boards (in addition to that provided on, e.g., the game controller board). Depending on the nature of the download, it will be advantageous, in performing assembly line downloading, to recognize or distinguish different boards, e.g. to obtain information regarding characteristics of the Board and/or its identity or history.

According to an embodiment of the invention, automation of the step of obtaining gaming terminal component characteristics is enabled or facilitated by including, on one or more of the gaming terminal boards or other components, an electronic memory device, e.g., of the type depicted in block diagram fashion, in FIGS. 2A or 2B.

In the embodiment of FIG. 2A, a memory device such as an EEPROM 212 is provided with a plurality of memory locations 214 which are preferably of a type which may be programmed or written-to many times. The memory device 212 is also provided with at least some memory locations 216 (such as a one or more rows of memory) which are configured such that they cannot be erased or changed after they have been written to or programmed. In the embodiment of FIG. 2A, the memory locations 216 are write-once or one time programmable (OTP) memory, meaning that after any of the program locations in the memory region 216 have been written to or programmed, subsequently none of the memory locations in the memory region 216 can be changed or erased. One example of this type of memory is that sold under Model No. M34R32 available from S. G. S. Thomson. This device provides 4096 bytes of EEPROM space 214 with an additional 32-byte OTP row 216.

FIG. 2B depicts a type of memory having a plurality of programmable memory locations 214 and a region of memory 218 (such as a row of memory) which is add-only (AO) memory. In add-only memory, it is possible to write to or program some of a plurality of memory locations 222a–222f, without writing to others. In the add-only row 218, after any memory location or group of locations 222 have been written to or programmed, those same memory locations cannot, thereafter, be changed or erased. However, memory locations in the row 218 which have not been previously written to or programmed can be, later, written to or programmed (once) even after a process of writing to or programming other memory locations in the same region or row 218. For example, in add-only memory, it is possible to program, e.g., a first memory location 222a at a first time such that the first memory location 222a cannot thereafter be changed or erased after said first time, but to still permit programming or writing to, e.g. a second (previously unprogrammed) memory location 222b at a second time, after said first time, such that the second memory location 222b cannot be changed or erased after the second time. In this way, as long as there remain memory locations in the add-only region 218 which have not previously been programmed or written to, it is possible to add further information to the add-only region 218. However, although it is possible to add information to the region 218 (as long as unprogrammed space remains) it is never possible to erase or change information once it has been written to the add-only region 218. One example of add-only memory is available from Dallas Semiconductor.

According to an embodiment of the invention, OTP or add-only (OTP/AO) memory is provided in each gaming terminal, preferably on at least one board of each gaming terminal (such as the game controller board) and, typically, on one or more peripheral boards 128a–128d or other boards or components. It is possible to provide for systems in which some gaming terminals 112a are provided with OTP/AO memory while others e.g. 112c are not (e.g. when, in the context of a networked casino system, some gaming terminals have been upgraded or replaced while others have not).

There are three major procedures or steps in connection with using such OTP/AO memory in embodiments of the present invention: storing the desired information onto the OTP/AO memory, reading or retrieving the information stored in the OTP/AO region, and using such retrieved information, e.g. for secure downloading. These processes involve communicating information between the OTP/AO memory and an external (to the gaming terminal) device (typically one or more computers 116,128). Although it would be possible to configure a system in which a gaming terminal contains only a single OTP/AO memory device which stores information relative to a plurality of different hardware components (such as identifying two or more different boards 122a–128d) it is preferred to provide a separate OTP/AO device on each separate board. In this way, changes to hardware (or, in some configurations, software) can be recorded directly on the changed component so that when components are physically removed (such as "swapping in" a new board) and/or modified (such as by changing jumper connections on a board) information relating to the identity and/or configuration of that board, stored on the on-board OTP/AO memory, will "travel with" the board.

Although it would be possible to configure a gaming terminal so that two or more boards (such as each board having an OTP/AO memory) were provided with a port or other connection specific to that board, to facilitate reading the OTP/AO memory of that board, preferably, the gaming terminal is provided with one or more system ports 126 or similar communication connections 127 through which it is possible to obtain or transmit information relating to any of a plurality of OTP/AO memories in the gaming terminal (e.g. via gaming terminal buses or other internal communication links 130*a–f*). The ports 126,127 may be provided on any of a number of gaming terminal components including the game controller board 122, but are preferably included in a separate communications board 124.

The information stored on the OTP/AO memory may indicate characteristics of the board's (or other component's) hardware or software either directly or indirectly. The information may indicate characteristics directly by, e.g., storing information in either coded or human readable (e.g. ASCII character form) which identifies such characteristics such as storing board or download clock speed, board processor type and the like. An example of information which indirectly indicates hardware or software characteristics of the board or component includes storage of an EEPROM serial number (which, e.g., may be used as an index into an off-board database which stores characteristics corresponding to such serial number). It is possible to store both direct and indirect indicators of characteristics on an OTP/AO memory. It is also possible to store information which has both indirect and direct uses. For example, storing a date of manufacture on an OTP/AO memory may be used as all or part of an index into a database to determine other board characteristics and/or may be used directly, where the date of manufacture is itself a relevant characteristic (such as for warranty or repair purposes).

Information may be stored into OTP/AO memory in a number of fashions. In one embodiment, some or all of the information stored in the OTP/AO memory is stored at the time of memory manufacture, by the memory fabricator. Examples of information that may be stored in this fashion include memory serial (or other preferably unique) numbers and/or date of manufacture. Some or all information stored in an OTP/AO memory may be stored at the time of board manufacture (rather than memory manufacture) and/or may be stored at the time software is initially downloaded or programmed into a gaming terminal (or components thereof). Examples of information that might be stored in this fashion include board (rather than memory) serial number or version numbers, clock speed, processor type, software indicators or version numbers, date of assembly (board assembly or gaming terminal assembly) and/or an indicator of (initial) gaming regulatory jurisdiction (e.g. to distinguish a board intended for a first country or state from that intended for use in a second country or state).

Some or all of the information stored on OTP/AO memory may be stored at the time a gaming terminal is sold to, shipped to or received at a particular customer location or gaming jurisdiction. Some or all information stored in the AO memory may be stored when a gaming terminal component is revised, repaired, updated, reconfigured or the like (including both software and hardware revisions).

Preferably, the information stored in OTP/AO memory includes information that can be used for error or data integrity checks such as cyclic redundancy check (CRC) information, one or more parity bits or the like. In the case of write-only or one-time programmable memory, the error/data integrity check information is written when the memory is initially programmed. In the case of add-on memory, error checking or data integrity information may be stored (in a previously unprogrammed AO memory location) each time additional information is stored in the add-on memory. The provision of error checking or data integrity information is particularly useful or necessary in providing the capability of downloading to gaming terminals (e.g. in order to provide the desirable or required confidence that inadvertent or intentional changes are not made to a gaming terminal in such a fashion as to result in gaming terminal operation which is out of compliance with local gaming regulations). For example, in the absence of an error or data integrity check, it might be possible that a memory read error would permit downloading of a program configured for a first jurisdiction, into a machine located in a second jurisdiction (e.g. because, the laptop 128 or other source of download programming selected the "wrong" program for downloading based on incorrect information). It is believed that providing error or data integrity check information in OTP/AO memory will assist in preventing, or at least reducing the likelihood of, this type of improper download.

Table I provides one example of a set of information that may be stored in OTP/AO memory according to one embodiment of the invention. In one embodiment, data stored in the OTP row and/or in the ROM are stored in little endian format. In the example of Table I, items indicated having a potential use of "revision control" are, in at least one embodiment, used during download operations. Preferably the EEPROM serial number is a number which is unique for each EEPROM (at least for a given vendor and purchaser). The communications ID, may be, e.g. used by the board firmware for providing communication to a host computer. The platform and target information may be used in connection with, e.g., host to terminal download communications. The vendor ID may be a code used for identifying the vendor of the EEPROM. The clock speed may be used in connection with allowing the peripheral board firmware to communicate with a host computer. Preferably the CRC is used by the board firmware to validate the OTP data before its use.

In addition to the data defined in the OTP row, according to one embodiment, the first 20 bytes as of the EEPROM normal memory space will be used for storing, e.g., printed circuit board serial number information of the peripheral board, e.g., stored in ASCII format. Preferably, two bytes of CRC information is also provided. To protect this information from corruption, preferably the first sixty-four bytes of the EEPROM space is configured as read only memory (ROM).

TABLE I

OTP Row Memory Allocation

| Starting Address (hexa-decimal) | Bytes | Format | Description | Potential Uses |
|---|---|---|---|---|
| 0x00 | 4 | Binary | EEPROM serial number | Revision Control |
| 0x04 | 1 | Binary | Communications ID | Used at Powerup for Intra-Game Communications |

TABLE I-continued

OTP Row Memory Allocation

| Starting Address (hexadecimal) | Bytes | Format | Description | Potential Uses |
|---|---|---|---|---|
| 0x05 | 7 | ASCII | Date of manufacture | Warranty/Service/Revision Control |
| 0x0C | 2 | Binary | Platform and target | Intended Use |
| 0x0E | 8 | ASCII | Vendor ID | Warranty/QC/Service |
| 0x16 | 1 | Binary | Clock Speed | Used at Powerup for Intra-Game Communication |
| 0x17 | 1 | Binary | Processor Type | Used at Powerup for Intra-Game Communication |
| 0x18 | 6 | | Reserved for future use | |
| 0x1E | 2 | Binary | 2-byte CCITT CRC | Error/Data Integrity Check |

Although it is contemplated that the gaming terminal component characteristic information stored or indicated in the OTP/AO memory will be particularly useful in connection with download of information, (as described more fully below). It is also believed that the information may be useful in other contexts. Examples of other uses for OTP/AO information according to embodiments of the present invention, include providing the ability of gaming regulators to verify (e.g. on a random basis or for specific regulatory purposes) that a gaming terminal is configured properly for a particular jurisdiction, allowing personnel responsible for maintaining, repairing or updating gaming terminals to verify that a particular gaming terminal includes particular components, uploading information regarding gaming terminal components e.g. as part of a trouble report, inventory or tracking procedure, verifying characteristics, such as manufacture or sale date, of a gaming terminal or components thereof in connection with making decisions on warranty coverage, and the like.

Regardless of the purpose for reading information stored on an OTP/AO memory in a gaming terminal, the reading procedure will, at least in one embodiment, include sending a read command e.g. from a laptop 128 or central computer 116 via a port 126,127 to a communications board 124, (with the command typically either specifying that all OTP/AO memories should be read or specifying which board or OTP/AO board memory should be queried) and sending a read command (e.g. over a control line or a portion of communication bus 130) which contains or indicates read addresses for one or more OTP/AO memory portions. The commands may be configured to retrieve selected (addressed) portions or fields of the OTP/AO memory or may be configured to return the entire OTP/AO contents (e.g. a OTP/AO "row" of memory). In one embodiment, it is preferred to always return the entire contents of OTP/AO memory (particularly in the case of add-on memory) e.g. to help ensure that there has been no intentional or inadvertent storage of incorrect or misleading information in OTP/AO memory. For example, if a new (previously unprogrammed) field of an add-on memory has been programmed to reflect a new jurisdiction (i.e. a jurisdiction different from the original gaming regulatory jurisdiction programmed in the AO memory) reading the entire row would alert the download software that there has been a change in jurisdiction (and, if desired, prompt a check of the database to verify that this change in jurisdiction was correct and/or authorized), whereas reading only the newest or most recent fields of AO memory could result in downloading an unauthorized program (e.g. a program authorized only for a different jurisdiction). Thus, in a procedure where only the most recently programmed fields are read, there might be no indicator that the jurisdiction information may have been tampered with or inadvertently modified.

Hardware or software characterizing information read from the OTP/AO memory can be used in a number of fashions. In one embodiment, the information is used in downloading software to a gaming terminal (or components thereof). Procedures for downloading can be similar to those described e.g., in U.S. patent application Ser. No. 09/172,786 titled "Method for Downloading Data to Gaming Devices" filed on Oct. 14, 1998, and/or Ser. No. 09/088,205, now U.S. Pat. No. 6,135,887, filed Jun. 1, 1998 which is a continuation of Ser. No. 08/600,311, now U.S. Pat. No. 5,759,102 for "Peripheral Device Download Method and Apparatus" filed Feb. 12, 1996, all incorporated herein by reference.

The present invention can be used in connection with a process that involves loading information, received from an external device (such as a central computer) by a computing device (such as the microprocessor on the controller board) to a target which may be a gaming terminal component, including one or more peripheral devices. In this way it is unnecessary to have separate ports on each board for direct access to the peripheral devices (or other gaming terminal components) or related memories, thus making the process of updating the programming for peripheral devices or other gaming terminal components less time-intensive and less labor-intensive. In one embodiment, an updated or modified program is received in the gaming terminal from an external device (such as a hand-held or portable device or a central computer coupled via a communications link) and is downloaded or passed-through from the controller board to one or more coupled peripheral devices. Preferably, the programming information is downloaded in such a way as to reduce or minimize the amount of down time or inconvenience to players. In one embodiment, when the new program is downloaded from a central computer to each gaming terminal, the method avoids disabling all gaming terminals at the same time, such as by waiting until the gaming terminal is idle for a predetermined period before downloading or by cycling through various gaming terminals or groups of gaming terminals so that a relatively small number of the gaming terminals are disabled (for reprogramming) at any one time. When reprogramming of two or more peripherals attached to a given gaming terminal is desired, in one embodiment the new programming information for each device to be reprogrammed is downloaded to the gaming terminal and the gaming terminal begins downloading the information to the attached peripherals preferably only after all information has been downloaded to the terminal. In this way, only a single session of downloading to the gaming terminal is needed in order to provide eventual updating of two or more coupled peripherals or other components. In situations in which security is a concern, such as systems in which money handling occurs (e.g., gaming terminals, lottery terminals, and the like), it may be useful for the information to be encrypted when it is transferred to the computing device and is decrypted preferably in the gaming terminal. In one embodiment, the invention includes providing at least a first memory in a gaming terminal as a programmable memory; transmitting first information from an external source to the gaming device; transmitting the first information for receipt by said peripheral device; storing the first information in the first memory; and using the first information during operation of the peripheral device. Preferably such a method includes identification of the gaming terminal hardware or software, preferably using one or more memory devices which have identifying and/or characteristic-indicating information stored in non-erasable, non-modifiable memory, such as OTP/AO memory.

Downloading can be performed locally (e.g. by connection of a laptop 128 or other computer to the communications board 124 of a gaming terminal 112*a* or remotely from a local controller 114*a* or central computer 116. Preferably the downloading includes verifying the propriety of the software to be downloaded and/or verifying or adjusting download procedures (data transfer rate, error detection/correction procedures and the like) so that the download will result in a gaming terminal that is appropriately configured and operates as desired. Preferably, it is the source computer 128, 116 which performs such verifying. It is noted, however, that while such source-based checking will assist in eliminating or reducing the occurrence of, e.g. inadvertently inappropriate downloads, it might be possible to configure a laptop 128 to purposely download incorrect or inappropriate software. Accordingly, it would also be possible to configure the destination (the gaming terminal) in such a way that it will actively block or prevent downloading of software unless the software to be downloaded is identified by the destination (gaming terminal) as appropriate (based, at least in part, on information stored in OTP/AO memory). In this way, if an attempt was made to download a version of gaming software which, e.g., did not include a properly encrypted password for authenticating that the proposed download software has been approved by the appropriate gaming regulatory authorities, the gaming terminal 112*a* would, preferably, block or prevent the downloading of such software.

Another example of a use of information read from OTP/AO memory in a gaming terminal is to verify warranty coverage for servicing or repair of a gaming terminal. For example, if a particular gaming terminal was covered by a one-year warranty, it would be possible to configure the system such that a service person could determine the date of sale or delivery of a gaming terminal (or a component thereof), either directly or indirectly, based on information read from OTP/AO memory. As noted above, particularly in the case of AO memory, it is useful to configure a system to always read the entire memory row, e.g. to avoid a situation in which a new AO memory field is written with an incorrect sale date indicator (either inadvertently or intentionally).

Another situation in which information stored in OTP/AO memory may be used includes the manufacturing process and in particular the management of software downloading as part of a gaming terminal manufacturing process. An example of a use of component identification in connection with such management is described, e.g., U.S. patent application Ser. No. 09/172,743 titled "Program Management for Downloadable Devices", filed on even date herewith and incorporated herein by reference. Briefly, information stored in OTP/AO memory can be used in a number of such management procedures including verifying that the hardware present in a particular gaming terminal or component is compatible with a particular download procedure (e.g. a download bit rate or error detection/correction procedure) and/or that the software is compatible with or appropriate for the hardware (or other software) present in the gaming terminal or component (e.g. the software is compatible with the particular microprocessor present in the gaming terminal or component). Furthermore, information in OTP/AO memory may be used at the completion of the gaming terminal assembly (and/or intermediate assembly stages) to verify that the various components of the gaming terminal are compatible with one another (e.g., the gaming terminal does not have a bill acceptor appropriate for a first jurisdiction and a coin handler board appropriate for a second (different) jurisdiction) and/or the components and software in the gaming terminal are configured as desired (e.g. are approved for the gaming jurisdiction for which the gaming terminal is being built), includes the correct game software (e.g. does not download a poker game software when the terminal was intended to be a slot machine) and has the correct (typically most recent) version of software appropriate for the configuration of the gaming terminal. Additionally, information read from OTP/AO memory may be used in the management procedures to store appropriate information in a database. As noted above, in some configurations, a database is used to provide information about a gaming terminal, its configuration, components or history with such information being indexed, in the database, by information obtained from OTP/AO memory (e.g. a memory serial number or similar identifier number). Accordingly, as a gaming terminal is assembled, it is preferred, in at least this configuration, to read information from OTP/AO memory of the gaming terminal and its components, and store such information in a database, preferably in a fashion to achieve the desired database indexing or similar function.

In light of the above description, a number of advantages of the present invention can be seen. The present invention provides a way to identify a gaming terminal or its components in such a fashion as to substantially guard against inadvertent or intentional alterations (e.g. so as to increase the likelihood that gaming regulatory authorities will approve certain manufacture, assembly, repair and/or download procedures, particularly those which are at least partially automated and/or remote) by providing automatically accessible identification or characteristic information as part of the physical structure of the gaming terminal or component (e.g. as part of a memory mounted on a gaming terminal board). Preferably, the information travels with the gaming terminal or component and thus is automatically present and correct regardless of any changes (such as replacement of one or more boards of a gaming terminal). Because the information can be electronically programmed or stored (once only), the particular information which is provided or stored can be tailored to accommodate the contemplated use of the information (e.g. different manufacturers and/or different models or model lines of a given manufacturer may involve storing different information and/or storage in different formats). Because the stored information is provided electronically (rather than, e.g., provided as information printed or written on a circuit board) the likelihood of inadvertent or intentional modification of such information is lessened.

A number of variations and modifications of the invention can also be used. In general, it is possible to use some aspects of the invention without using others. For example, it is possible to provide non-erasable and non-modifiable information in connection with downloading software without providing information usable for or used with warranty verification. It is possible to store information in an encrypted or otherwise modified form. In one embodiment, some or all of the information which is used (e.g. in connection with downloading warranty verification and the like) and/or output from the device is stored in other memory or memory portions, such as normal EEPROM memory 214, e.g. with OTP/AO memory being used only for permitting access and/or verifying such memory (e.g. by providing an encryption key/decryption key, data integrity check information or the like). Although the non-erasable/modifiable memory is disclosed as being a portion of, or coupled to, normal EEPROM memory, it may be provided as a separate component or may be coupled to other types of memory. Although examples are provided in which a single row of OTP/AO memory is provided, more or fewer OTP/AO memory locations may be used.

In one embodiment, the gaming terminal is configured such that if an attempt is made to download certain types of improper software, the gaming terminal will be placed in an inoperative mode and/or notification of the attempt will be output e.g. to a local controller 114 or a central computer 116. Although, as noted, above, there are advantages to providing storage of characteristic-indicating information in electronic form, in one embodiment, information relating to characteristics (e.g. serial number, manufacture date or the like) may be stored or presented in optical (e.g. machine readable, bar code, or human readable form) e.g. on one or more of the gaming terminal boards. In this case, it may be useful to include a step which involves comparing the optical characteristic indicator with electronically-stored characteristic indicators.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

What is claimed is:

1. A method for downloading programming to a gaming terminal from a remote site, wherein said programming can appropriately be downloaded only to a gaming terminal with components having at least a first set of characteristics, the method comprising:

providing a gaming terminal having at least a first circuit board with a memory, at least a portion of which is non-erasable memory;

storing in said non-erasable memory at least first information indicative of identification characteristics of multiple components of said first circuit board;

transmitting said first information from said gaming terminal to said remote site;

comparing said first information with identification characteristics of said programming;

downloading programming from said remote site only if said programming has compatible identification characteristics with said first information.

2. A method, as claimed in claim 1, wherein said non-erasable memory is one-time programmable memory.

3. A method as claimed in claim 2 wherein said step of transmitting comprises transmitting all programmed portions of said one-time programmable memory.

4. A method, as claimed in claim 1, wherein said information indicative of characteristics of said first circuit board includes information selected from the group consisting of memory serial number, an Identification number, date of manufacture, platform, target, vendor identification, board clock speed, and processor type.

5. A method, as claimed in claim 1, further comprising:

using said information indicative of characteristics of said first circuit board to identify a gaming jurisdiction location of said gaming terminal; and downloading said programming only if said programming has been approved for said gaming jurisdiction.

6. A method, as claimed in claim 1 wherein said step of providing comprises providing an EEPROM which is configured with a row of one-time programmable memory.

7. A method, as claimed in claim 1, wherein a plurality of programs is stored at said remote location and further comprising using said information indicative of characteristics of said first circuit board to select a program for downloading to said gaming terminal.

8. A method, as claimed in claim 1, wherein said step of transmitting is performed in response to a query sent from said remote location to said gaming terminal.

9. Apparatus usable for downloading programming to a gaming terminal from a remote site, wherein said programming can appropriately be downloaded only to a gaming terminal with components having at least a first set of characteristics, the apparatus comprising:

at least a first circuit board in said gaming terminal having a memory, at least a portion of which is non-erasable memory including at least first information indicative of identification characteristics of multiple components of said first circuit board stored in said non-erasable memory;

means for transmitting said first information from said gaming terminal to said remote site;

means for downloading programming of said remote site only if said programming has compatible characteristics with said first information.

10. Apparatus, as claimed in claim 9 wherein said memory comprises read-only memory.

11. Apparatus, as claimed in claim 9 wherein said memory comprises EPROM memory.

12. Apparatus, as claimed in claim 9, wherein said non-erasable memory is one-time programmable memory.

13. Apparatuses claimed in claim 12 wherein said means for transmitting transmits all programmed portions of said 1-time programmable memory.

14. Apparatus, as claimed in claim 9, wherein said information indicative of characteristics of said first circuit board includes information selected from the group consisting of memory serial number, an Identification number, date of manufacture, platform, target, vendor identification, board clock speed, and processor type.

15. Apparatus, as claimed in claim 9, further comprising:

means for identifying a gaming jurisdiction location of said gaming terminal using said information indicative of characteristics of said first circuit board; and means for downloading said programming only if said programming has been approved for said gaming jurisdiction.

16. Apparatus, as claimed in claim 9, wherein a plurality of programs is stored at said remote location and further comprising means for selecting a program for downloading to said gaming terminal, using said information indicative of characteristics of said first circuit board.

17. Apparatus, as claimed in claim 9, wherein said first circuit board is a game controller board.

18. Apparatus, as claimed in claim 9 wherein said first circuit board is a peripheral controller board.

19. A method for downloading programming having to a gaming terminal from a remote site, wherein said programming can appropriately be downloaded only to a gaming terminal with components having at least a first set of characteristics, the method comprising:

providing a gaming terminal having at least a first circuit board with a memory, at least a portion of which is non-erasable memory;

storing in said non-erasable memory at least first information indicative of identification characteristics of multiple components of said first circuit board;

transmitting said first information from said gaming terminal to said remote site;

comparing said first information with identification characterizing information of programming for downloading; and downloading said programming only if said identification characterizing information of said programming is compatible with said first information at least as to operability and as to gaming jurisdiction laws.

20. The method of claim 19 including the step of identifying from said first information a gaming jurisdiction location of said gaming terminal and downloading said programming only if said programming has been approved for said gaming jurisdiction, as indicated by said first information.

21. The method of claim 19 including the steps of reading an entire memory location including a range between newest fields and oldest fields in order to alert the remote site when a change in the identification characterizing information has occurred.

* * * * *